Feb. 20, 1951 R. W. CHAFFEE 2,542,901
PACKAGE CLOSING AND SEALING MACHINE
Filed Feb. 16, 1950 3 Sheets-Sheet 3
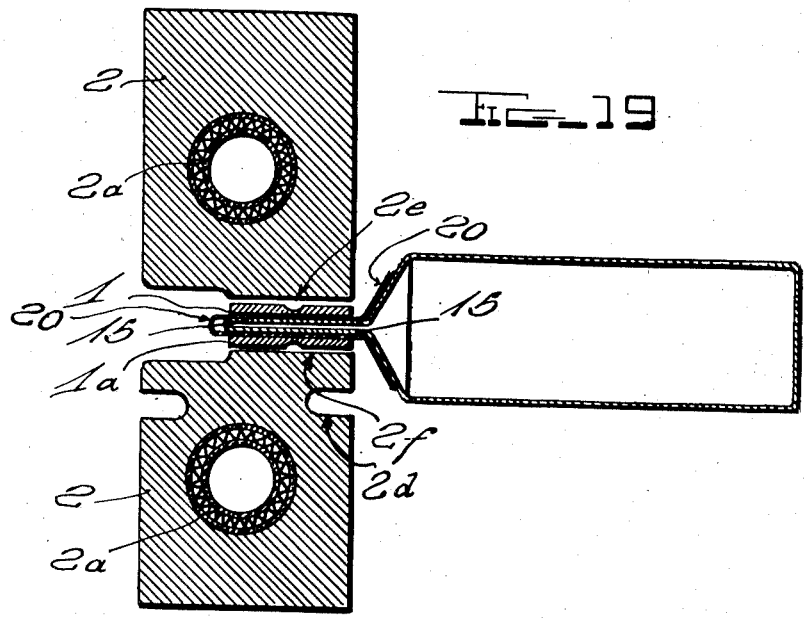
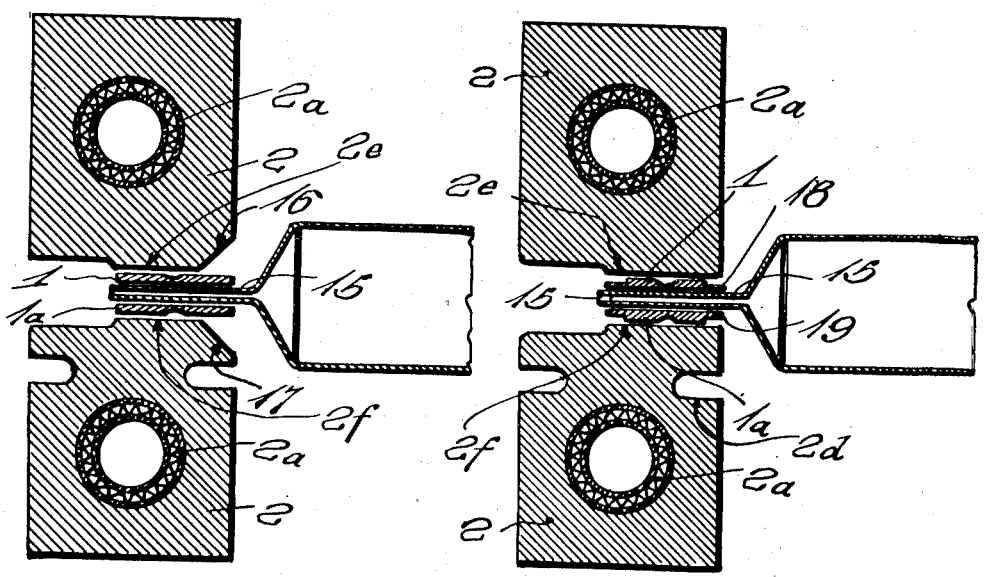
INVENTOR.
Ralph W. Chaffee,
BY
John B. Brady
ATTORNEY Patented Feb. 20, 1951

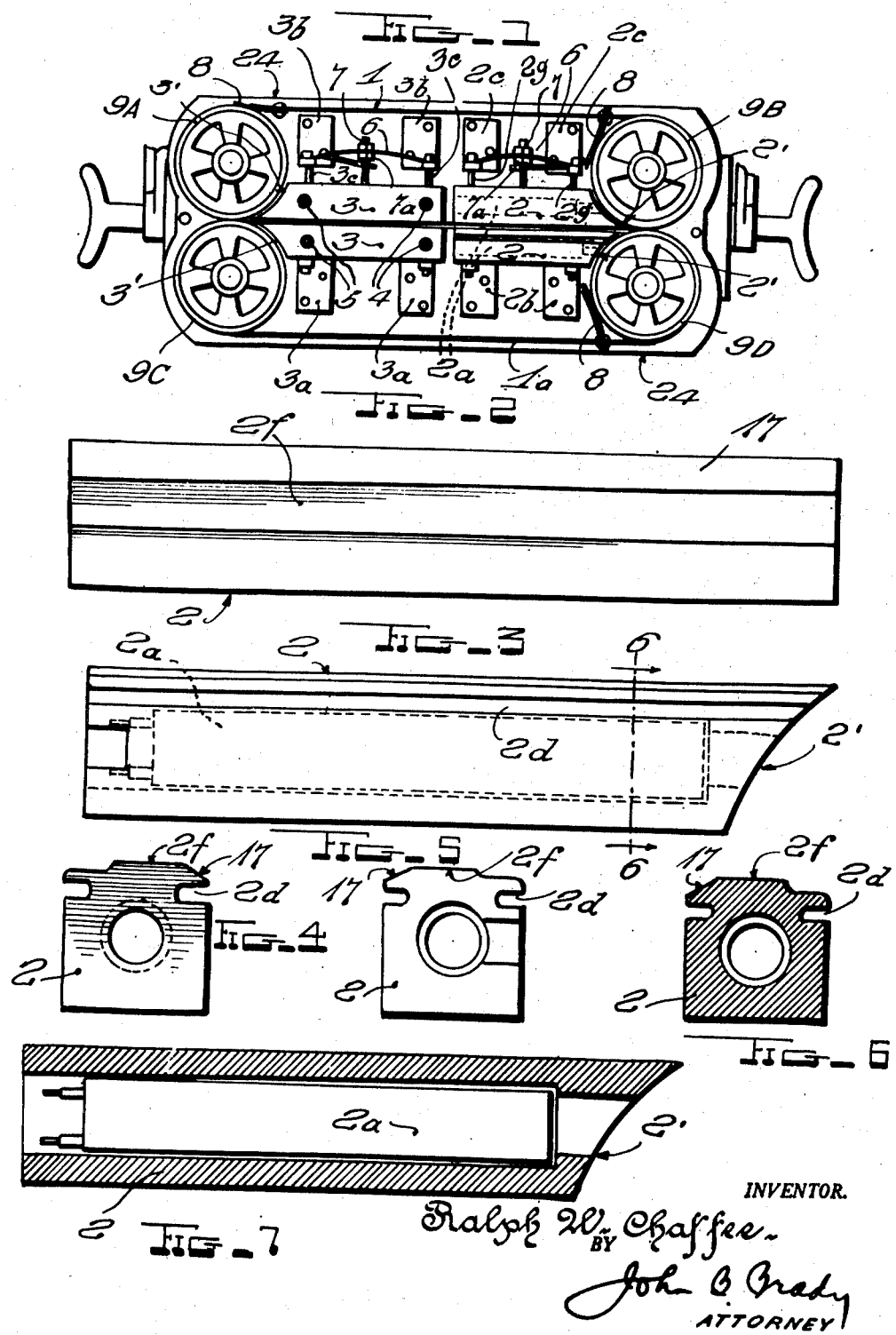

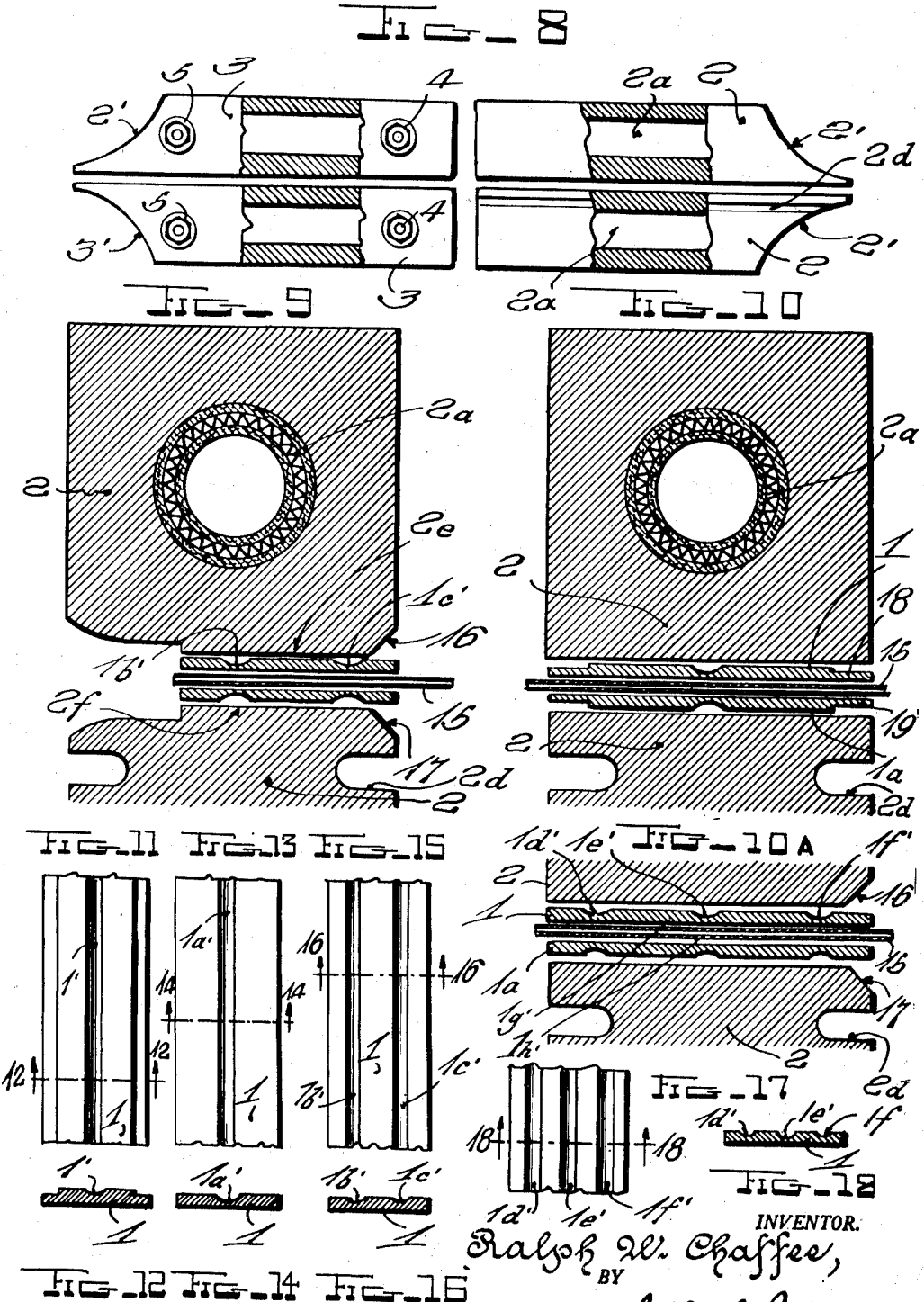

2,542,901

UNITED STATES PATENT OFFICE 2,542,901

PACKAGE CLOSING AND SEALING MACHINE

Ralph W. Chaffee, San Francisco, Calif.

Application February 16, 1950, Serial No. 144,525

12 Claims. (Cl. 154—42)

My invention relates broadly to heat sealing apparatus and more particularly to a construction of package sealing machine adapted for rapid sealing of packages formed from Pliofilm, metal foil, glassine, cellophane and wax paper and the like.

This application is a continuation in part of my co-pending application Serial Number 723,566 filed January 22, 1947, for Package Closing and Sealing Machine.

The primary object of the present invention is to provide a heat sealing apparatus constructed and arranged to apply heat and pressure by means of a pair of movable endless bands to overlapping portions of heat sealable material while the latter is conveyed by said bands, the material being heated to a plastic state and forcibly cooled under pressure, where the heat sealable material is subjected to heat in such a manner that folds or gussets will be sealed at the proper zone against moisture escape or infiltration to conform to very rigid tolerances and specifications.

Another object of my invention is to provide a pre-formed structure of heat sealing bands to take advantage of the desirable effects that I have discovered and proven as advantageous in producing moisture-proof barriers and mechanical economies in the sealing of packages formed from the hereinbefore mentioned materials.

Still another object of my invention is to provide a construction of sealing bands of predetermined cross-section to impress lines down the seal due to varying degrees of temperature and pressure that are applied by reducing the thickness of the bands longitudinally, the thinner portions of the bands having less contact with associated heated blocks and operating to apply less pressure upon certain of the zones of the material being sealed.

Still another object of my invention is to provide a structure of sealing bands for a continuous sealing machine the bands having varying degrees of thickness transversely of the sections thereof where the thinner portions convey less heat and pressure to the heat sealable material than the thicker portions thereof resulting in seal lines that indicate the varying pressures and temperatures that are applied producing an added safety factor to the seal.

A further object of my invention is to provide a construction of heater blocks coacting with the moving bands of a continuous sealing machine in which less heat is applied at the package side of the blocks by cutting away portions of the blocks so that the radiated heat is applied on one edge of the seal thereby graduating the heat and avoiding pinholes on the edge of the seal where the bulge of the package tends to thin the film at its near plastic stage.

Other and further objects of my invention reside in the structure of heater blocks and the coacting structure of the moving bands of a heat sealing machine as set forth more fully in the specification hereinafter following by reference to the accompanying drawings in which:

Figure 1 is a top plan view of the improved sealer of my invention illustrating the manner of passing the bags to be sealed through the heating and cooling sections of the sealer; Fig. 2 is a top plan view of one of the heater blocks employed in the sealer shown in Fig. 1; Fig. 3 is a side elevational view of one of the heater blocks used in the sealer; Fig. 4 is an end view of the heater block of Figs. 2 and 3; Fig. 5 is an end view of the heater block of Fig. 4 looking at the opposite end; Fig. 6 is a transverse sectional view taken through the heater block of the sealer as shown in Figs. 2-5 the view being taken substantially on line 6—6 of Fig. 5; Fig. 7 is a longitudinal section through the heater block of Figs. 2-6; Fig. 8 is a schematic view showing the relative arrangement of the heating and cooling blocks of the sealing machine that constitute pressure members which are arranged in association with the traveling belts of the sealer of my invention, the heating and cooling pressure members being broken away and illustrated in section; Fig. 9 is an enlarged cross-sectional view through one form of the coacting heater blocks and the traveling belts, the view indicating the manner of champfering off the heat sealing blocks at their longitudinal edges which produces a sharp heat gradient accomplishing the forementioned results by narrowing the coacting anvil faces of the blocks and tapering off the heat applied to the heated material; Fig. 10 shows a modified form of the heating blocks and coacting traveling belts for securing the temperature and pressure gradient at one edge of the sealing material; Fig. 10A shows still another modified form of block and traveling belt construction; Fig. 11 shows in plan view a portion of the structure of traveling belt illustrated in Fig. 10; Fig. 12 is a transverse sectional view taken on line 12—12 of Fig. 11; Fig. 13 is a plan view of a portion of a modified form of traveling belt; Fig. 14 is a transverse sectional view taken on line 14—14 of Fig. 13; Fig. 15 shows a plan view of a portion of the structure of traveling belt shown in Fig. 9; Fig. 16 is a transverse sectional view taken on line 16—16 of Fig. 15; Fig. 17 is a fragmentary plan view of the traveling belt shown in Fig. 10A; Fig. 18 is a transverse sectional view taken on line 18—18 of Fig. 17; Fig. 19 is an enlarged sectional view showing the manner of applying heat and pressure to the material to be sealed using a full width heat sealing band contact with the heater blocks under conditions where a bag top is used or where sensitive sealable films are not involved or are protected by other means such as a multiwall bag; Fig. 20 is a view showing the application of the structure of the heater blocks of Fig. 9 to the sealing of material in a manner that prevents thinning of the film and the decreasing of film strength and development of pin holes; and Fig. 21 shows the application of the structure of Fig. 10 to sealing of material where heat control is secured by thinning the band instead of champfering the longitudinal edges of the heater blocks and narrowing the anvil faces as in Fig. 20.

My invention accomplishes the sealing of commercial films, such as Pliofilm, metal foil, glassine, cellophane, wax paper, and other material by applying heat and pressure in varying degrees to the material in very special manner. I have devised sets of blocks coacting with travelling band conveyers of metallic construction highly conductive to heat and subject to rapid changes in temperature. The travelling bands pass between the surfaces of coacting blocks, one set of which is provided with heating units for imparting heat to the traveling bands and an adjacent set of which is forced cooled. A positive change in temperature is effected approximately midway of the linear length of travel of the bags being sealed between the travelling bands. I construct the blocks which are heated so that a temperature gradient is provided at the longitudinally extending edges of the blocks for reducing the temperature of the material being sealed at the portions thereof which enlarge into the bag. The maximum heat is applied directly at the sealing zone while minimum heat is applied at the zones contiguous therewith and which extend into the enlarged portion of the bag. This temperature gradient is obtained by chamfering the longitudinally extending edges of the heat blocks adjacent the coacting anvil faces thereof and/or the metallic bands which coact therewith are varied in transverse section to produce differing zones of temperature and pressure transversely of the bands. The sealing zones imparted to the bags may thus be controlled while maintaining the strength of the structure of the bags and in weakening the bags at the vital points necessary to enclose the merchandise therein. Pressure is applied between the blocks and the travelling bands for impressing the bands against the material to be sealed. The abrupt change in temperature which is produced substantially midway of the linear travel of the bands effects that chilling necessary to set the material being sealed after the material has been elevated to a pliable or adhesive condition under the action of the heated blocks.

Referring to the drawings in detail reference characters I and Ia designate two metallic heat conveyable bands that have the triple function of conveying the package of heat sealable material through the machine; conducting high temperature or low temperature to the material of the bag being sealed; and allowing an abrupt change in the condition of temperature. The reduction of thickness at the center I' and Ia' in the belts as illustrated more particularly in Figs. 11–14 perform a dual function of eliminating work hardening of the belts and allowing the belts to operate effectively over the crowns of the mounting pulleys shown at 9A, 9B, 9C and 9D in Fig. 1. The heat is generated from electrical resistor elements shown at 2a and replaceably mounted as cartridges in coacting blocks 2 shown more particularly in Figs. 3–10. Particularly in Figs. 2–9, 10A and 20 the blocks have been champfered off so that the heat applied to the material to be sealed is graduated off in proportion to the heat applied which is essential in sealing sensitive films that stretch when heated. Filled bags of liquid will leak at the seal if heat is not applied by a graduated method or perfectly controlled. Adjacent the blocks 2 I arrange forced cooling blocks 3 both of which are hollow and which are provided with water or refrigerant intake connections 4 and water or refrigerant discharge connections 5 by which the adjacent surfaces of block 3 are maintained at low temperature while the adjacent blocks 2 are electrically maintained at high temperature.

The sets of coacting blocks 2 and 3 are arranged as illustrated in Fig. 1 within the traveling belts I and Ia inside of the casing 24 of the sealer. The belts I and Ia are mounted on pulley members 9A, 9B, 9C and 9D which are journalled interiorly of the casing of the apparatus. The pulley members 9A, 9B and 9D are mounted on floating hubs, while pulley member 9C is supported on a stationary hub. The pulley members 9A, 9B and 9D are continuously pressed toward each other by an arrangement of adjustable springs 8 supported by the casing of the apparatus and operative to tangentially contact portions of the pulleys for urging the pulleys into coacting pressure relationship whereby belts I and Ia are urged into plane-to-plane coacting relation. This pressure arrangement is augmented by pressure applied to the upper heated block 2 and the cooling block 3 as represented in Fig. 1 by tension leaf spring 6, the effective pressure of each of which being adjustable by means of adjustable nuts 7 on screw 7a which extend from the blocks 2 and 3 as shown. Suitable supporting brackets are provided as represented at 2b for supporting one of the heated blocks 2 in fixed position while another set of brackets 2c is provided for supporting the other of the heated blocks 2 in adjustable position through slidable pins 2g that extend therefrom. Similarly one of the cooling blocks 3 is fixedly mounted by means of brackets 3a while the coacting block 3 is adjustably mounted in brackets 3b by pins 3c that are slidable therethrough. Accordingly, the belts I and Ia may travel between the heating blocks 2 and the cooling blocks 3 with pressure applied thereto both by reason of the continuous tendency of the pulley members 9A, 9B, 9C and 9D to yieldably move toward each other supplemented by the tendency of the blocks 2 and blocks 3 to yieldably move toward each other.

In order to maintain the belts I and Ia on the pulley members 9A, 9B, 9C and 9D, the pulleys are suitably crowned and the flexibility of the belts is such that the belts tend to remain centered on the pulleys continuously throughout the driving operation thereof due to the thinning of the belts conforming to the crown.

The protruding ends of filled bags carried by a progressively moving conveyor may enter between the belts 1 and 1a and first be subjected to pressure and heat between belts 1 and 1a adjacent blocks 2 and then the temperature abruptly changed by the passage united edges of the bags between belts 1 and 1a adjacent the cool zones at blocks 3 for chilling the heated joint and effect a firm seal thereof and offset possible adhesion of sensitive materials to the belt.

The reduction of thickness in the belts 1 and 1a insure the quick application of heat from blocks 2 to the compressed material of the bags is accomplished through the alignable reduction in thickness 1' or 1a' shown in Figs. 11—13—15—17. At the same time these methods of reduction of thickness impart sufficient transverse flexibility to the belts 1 and 1a to insure maintenance of the belts on the crowned pulleys 9A, 9B, 9C and 9D and to counteract work hardening thereby lengthening the life of the belts. The method of reduction in thickness 1a produces double line effect when sealing certain materials and adds to the efficiency of the seal.

Figs. 15 and 16 show a further construction of travelling band of the type which I have illustrated in position in Fig. 9 between the heated blocks where two zones for effecting the impression of seals in the material being treated are applied as represented at 1b' and 1c'. By relieving the transverse section of the band 1 along the longitudinally extending zones 1b' and 1c' the amount of heat reaching the material 15 which is being sealed is controlled and reduced in two spaced longitudinally extending zones. In order to decrease the amount of heat reaching the portions of the bag which enlarge into the parts of the bag enclosing the merchandise, I champfer the longitudinally extending edges of the blocks 2 as shown at 16 and 17 to provide inclined faces extending at substantially 45° to the anvil faces 2e and 2f of the heater blocks. Thus both pressure and temperature is decreased immediately adjacent the sealing zone 1c' thereby preventing the thinning out of the material of the bag at the position where the bag enlarges to enclose the merchandise.

In Figs. 17 and 18 I have shown a further modified form of travelling band in which three longitudinally extending zones are provided transversely of the band as represented at 1d', 1e' and 1f'. As represented in Fig. 10A the heater blocks 2 apply both heat and pressure against the travelling bands 1 and 1a which are relieved in section at 1d', 1e' and 1f' for decreasing both heat and pressure upon the material 15 in the longitudinally extending zones and producing the intermediate longitudinally extending sealing zones as represented at 1g' and 1h' in material 15. The adjacent coacting edges of blocks 2 are chamfered at 16 and 17 as heretofore explained.

In Fig. 10 I have shown the manner in which the close section of the bands 1 and 1a as illustrated in Figs. 11 and 12 produce both controlled pressure and temperature in effecting a sealing operation. In this arrangement the blocks 2 are not chamfered but in lieu thereof the cross section of the bands is controlled so that the edges of the bands represented at 18 and 19 are reduced in section. This has the effect of transferring less heat and less pressure to the material 15 at that portion thereof where the material enlarges into the sack portion of the bag thereby preserving the structure of the material and preventing thinning out and weakening thereof.

In Fig. 19 I have illustrated more clearly the condition which exists when the full anvil faces 2e and 2f of the heater blocks 2 contact the travelling bands 1 and 1a with the material 15 of the bag therebetween. This heat and pressure application is advantageous when heat sealing certain types of material as an illustration, when sealing a film requiring considerable heat in order to penetrate bag tops, sometimes called saddles or tents, as represented in Fig. 19 at 20, the sealing operation required is to seal the bag top on the bag and also to seal the bag itself therebetween in one operation. A similar condition exists when a moistureproof lining inside of a paper bag is desired sealed, this heater block construction transmits more heat over a larger area accomplishing the desired results. However, when the thin heat sensitive material 15 is sealed upon itself, it is essential that the structure set forth in Fig. 20 and heretofore explained be employed in which the longitudinally extending edges of blocks 2 are chamfered at 16 and 17 and the anvil faces thus narrowed to relieve both pressure and temperature at the zone intermediate the seal and the enlarged portion of the bag preventing thinning of the material and decreasing of the film strength thereof with the incidental pinholes which impair the usefulness of the bag in the protection of merchandise.

As shown in Fig. 21 results comparable to the results obtained by the construction shown at Fig. 20 are obtainable by thinning the transverse section of the bands 1 and 1a at 18 and 19 by relieving both temperature and pressure in the position intermediate the sealing zone and the enlarged portion of the bag which encloses the merchandise.

In all forms of my invention the thickened portions of the travelling bands serve to transfer the greater amount of heat and pressure from the blocks 2 to the material 15 impressing sealing zones in the material 15 by the longitudinally extending portion provided by the groove or grooves. Thus a multiplicity of successive sealing zones may be provided in the thin material 15 of the bag.

The heating and cooling means which I arrange inside of the envelopes formed by each of the moving belts have tapered extremities which extend to a position closely conforming to the contour of the pulleys and the junction thereof with the belts. In the case of the heating means these projections are indicated at 2' on the blocks 2, the projections being curved to fit closely adjacent the pulleys. In the case of the cooling blocks 3 the tapered extensions are indicated at 3' closely fitting into the space between the belts and the surfaces of the pulleys 9A and 9C. Thus the heating medium and the cooling medium are both maintained immediately adjacent the belts and the supports thereof for most effectively employing the low and high temperatures established by the cooling or heating means.

Temperature control of the heating elements that transmit the heat through the heat sealing bands into the compressed material 15 is afforded by means of a thermostat which opens and closes the power circuit enabling the proper amount of heat to be transmitted to the heat sealable material. The thermostat is fully adjustable.

The thermostat bulb is mounted adjacent the blocks 2 in groove 2d and connected to a bellows in the thermostat which is mounted on the panel board. This bellows activates a switch which turns the power on and off, regulating the temperature of the blocks 2 which in turn transmit the heat through the heat sealing bands 1 and 1a into the heat sealing material 15.

The apparatus of my invention has been found to be very practical in construction and successfully used in operation. While I have described certain of the preferred embodiments of my invention I realize that modifications may be made and I desire that it be understood that no limitations upon my invention are intended other than may be imposed by the scope of the appended claims.

What I claim as new and desire to secure by Letters Patent of the United States is as follows:

1. A machine for sealing bags formed from thin sheet material including a pair of coacting travelling bands for progressively advancing the bags to be sealed with the thin sheet material thereof gripped between the bands, sets of blocks maintained in coacting relation with the rear surfaces of said bands, one set of said blocks including heating means therein and another set of said blocks including cooling means therein, the said blocks containing said heating means being narrowed at the edges thereof adjacent the juncture of the thin sheet material with the body of the bag being sealed for reducing the application of heat at the said junction.

2. In a bag closing and sealing machine a pair of coacting bands arranged to move linearly with the flat faces thereof extending linearly with respect to each other, sets of blocks coacting with said bands for pressing said bands into contact relation during the movement thereof for gripping layers of thin sheet material to be sealed therebetween and apply both heat and pressure to the layers of thin sheet material and means for reducing the temperature gradient at a position adjacent one edge of the travelling bands for correspondingly reducing the temperature applied to said thin sheet material at the position adjacent the edges of said blocks.

3. In a bag closing and sealing machine a pair of coacting bands arranged to move linearly with the flat faces thereof extending linearly with respect to each other, sets of blocks coacting with said bands for pressing said bands into contact relation during the movement thereof for gripping layers of thin sheet material to be sealed therebetween and apply both heat and pressure to the layers of thin sheet material and means for reducing the pressure gradient applied to said bands and the thin sheet material therebetween in a zone adjacent certain of the coacting edges of said blocks.

4. In a bag closing and sealing machine a pair of coacting bands arranged to move linearly with the flat faces thereof extending linearly with respect to each other, sets of blocks coacting with said bands for pressing said bands into contact relation during the movement thereof for gripping layers of thin sheet material to be sealed therebetween and apply both heat and pressure to the layers of thin sheet material and means adjacent certain of the coacting edges of said blocks for reducing both the temperature and pressure gradients applied to said bands and the thin sheet material gripped therebetween.

5. In a bag closing and sealing machine a pair of coacting bands arranged to move linearly with the flat faces thereof extending linearly with respect to each other, and sets of blocks coacting with said bands for pressing said bands into contact relation during the movement thereof for gripping layers of thin sheet material to be sealed therebetween and apply both heat and pressure to the layers of thin sheet material, said blocks being narrowed at coacting adjacent edges thereof to provide inclined beveled faces removed from contacting relation with adjacent linear peripheral edges of said bands for reducing the temperature and pressure imparted to the said linear edges of said bands and correspondingly reducing the temperature and pressure applied to the thin sheet material along a predetermined zone thereof.

6. In a bag closing and sealing machine a pair of coacting bands arranged to move linearly with the flat faces thereof extending linearly with respect to each other, and sets of blocks coacting with said bands for pressing said bands into contact relation during the movement thereof for gripping layers of thin sheet material to be sealed therebetween and apply both heat and pressure to the layers of thin sheet material, said blocks having adjacent aligned edges thereof beveled toward each other on opposite sides of said bands at angles of approximately 45° for reducing both the pressure and the temperature applied to said bands and to the thin sheet material gripped therebetween along a predetermined zone.

7. In a bag closing and sealing machine a pair of coacting bands arranged to move linearly with the flat faces threof extending linearly with respect to each other, sets of blocks coacting with said bands for pressing said bands into contact relation during the movement thereof for gripping layers of thin sheet material to be sealed therebetween and apply both heat and pressure to the layers of thin sheet material, said blocks having adjacent edges thereof narrowed for reducing both the pressure and temperature applied to said bands along one of the linear edges thereof and to the thin sheet material gripped between said bands along a predetermined zone and a longitudinally extending groove disposed in the side of one of said blocks and forming a cavity for a thermostatic control member.

8. In a bag closing and sealing machine a pair of coacting travelling bands linearly movable for gripping layers of sheet material to be sealed therebetween, sets of blocks disposed adiacent the inner faces of said bands, longitudinally extending anvil faces on said blocks extending in contacting relation with the rear faces of said bands for applying heat and pressure thereto and to the thin sheet material gripped between the adjacent faces of said bands, said anvil faces being narrowed along longitudinally extending linear edges of said blocks for regulating the temperatures and pressure gradients applied to the thin sheet material along a predetermined zone thereof.

9. In a bag closing and sealing machine a pair of coacting travelling pressure applying and heat conducting metallic bands linearly movable for gripping and advancing layers of thin sheet material therebetween, said bands including a longitudinally extending central portion of reduced section therein for reducing the amount of pressure and quantity of heat transferred therethrough to the thin sheet material being sealed.

10. In a bag closing and sealing machine a pair of coacting travelling pressure applying and heat conducting metallic bands linearly movable for gripping and advancing layers of thin sheet material therebetween, said bands including peripheral edge portions of reduced section and a longitudinally extending central portion of reduced section therebetween.

11. In a bag closing and sealing machine a pair of coacting travelling pressure applying and heat conducting metallic bands linearly movable for gripping and advancing layers of thin sheet material therebetween, heat transferring and pressure applying blocks establishing contact relation with the inner faces of said bands, said blocks being narrowed along coacting longitudinally extending edges thereof and said bands having longitudinally extending peripheral portions of reduced section adjacent the chamfered edges of said blocks whereby the temperature and pressure applied to the thin sheet material along a predetermined zone is substantially reduced.

12. In a bag closing and sealing machine a pair of coacting travelling pressure applying and heat conducting metallic bands linearly movable for gripping and advancing layers of thin sheet material therebetween, said bands including a multiplicity of longitudinally extending linear recesses therein for reducing the heat conducting and pressure transferring properties of said bands in predetermined zones along the length thereof.

RALPH W. CHAFFEE.

REFERENCES CITED

The following references are of record in the file of this patent:

UNITED STATES PATENTS

| Number | Name | Date |
| --- | --- | --- |
| 1,361,970 | Dickey | Dec. 14, 1920 |
| 2,248,038 | Adams | July 8, 1941 |
| 2,392,695 | Rhodin | Jan. 8, 1946 |
| 2,410,834 | Messmer | Nov. 12, 1946 |
| 2,469,972 | Lowry | May 10, 1949 |